F. D. LAMBERT.
LOCOMOTIVE WHEEL HUB AND PLATE.
APPLICATION FILED MAR. 6, 1920.
1,434,444.
Patented Nov. 7, 1922.
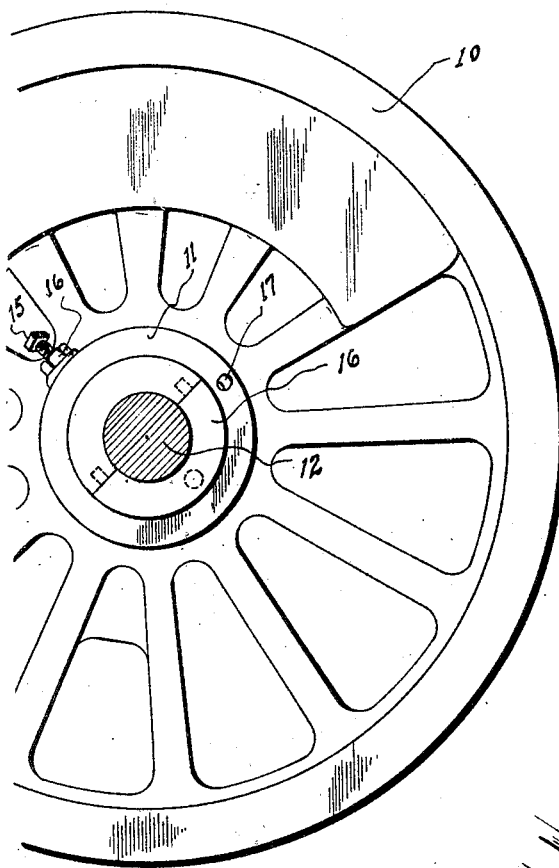
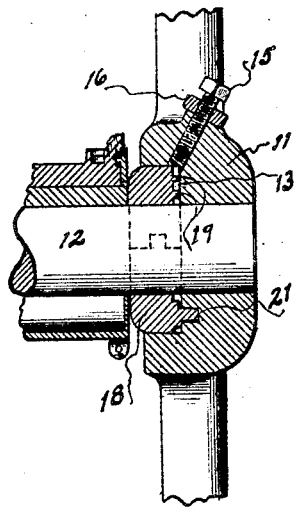
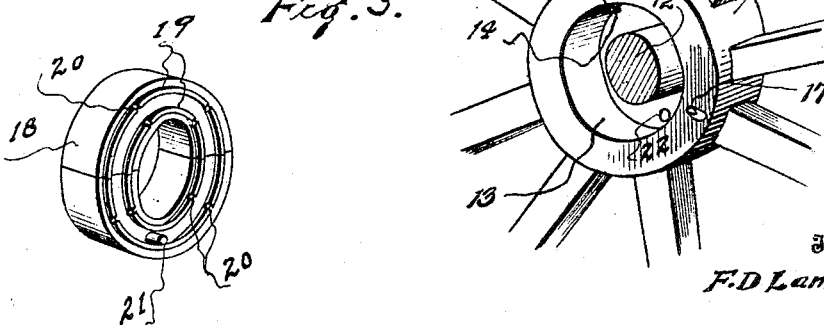
Inventor
F. D. Lambert
By Lacey & Lacey, Attorneys Patented Nov. 7, 1922.

1,434,444

UNITED STATES PATENT OFFICE.

FLOYD D. LAMBERT, OF FORT WORTH, TEXAS.

LOCOMOTIVE WHEEL HUB AND PLATE.

Application filed March 6, 1920. Serial No. 363,704.

*To all whom it may concern:*

Be it known that I, FLOYD D. LAMBERT, citizen of the United States, residing at Fort Worth, in the county of Tarrant and State of Texas, have invented certain new and useful Improvements in Locomotive Wheel Hubs and Plates, of which the following is a specification.

This invention relates to improvements in hub plates for locomotive drive wheels and more particularly to that type in which the plate is seated in a socket in the hub and is cushioned by the compression of a fluid within the socket behind the plate, means being provided for further compressing the fluid from time to time in order to adjust the plate in the direction of the journal box and thus take up the wear between the parts, and the primary object of the invention is to provide means for inhibiting adjustment of the plate beyond the safety point. After such a plate has been in use for a long period of time it becomes worn so thin that further adjustment would be liable to result in its being torn loose thereby probably damaging the journal box or causing other damage. Therefore, the invention contemplates, as stated, the provision of means for inhibiting further adjustment of the plate after it has become worn to a predetermined thinness.

In the drawings:

Figure 1 is an elevation looking at the inner side of a locomotive drive wheel embodying the present invention, Figure 2 is a fragmentary vertical sectional view taken through the hub, a portion of a conventional driving box being shown, and Figure 3 is a fragmentary perspective view illustrating the hub plate and hub in detail.

Referring more particularly to the drawings, I have shown the present invention embodied in a conventional locomotive drive wheel 10. The hub 11 of the wheel is formed to receive a drive axle therethrough in the usual manner, said axle being conventionally illustrated at 12, and formed in the inner side of the hub about the axle in an annular recess or socket 13. Opening into this socket at the bottom thereof is a channel 14 and threaded into said channel is a plunger 15 upon which is preferably arranged a lock nut 16. Formed through the inner side face of the hub to communicate with the socket 13 at a point medially of its depth is a vent or relief opening 17.

Pressed into the socket 13 of the wheel hub is an annular hub plate 18 surrounding the axle 12 and projecting beyond the inner face of the hub to coact with a driving box. This plate may be formed as an integral structure or, if desired, may, as illustrated in the drawings, be formed of mating semi-circular sections one provided at its ends with sockets and the other provided at its ends with dowel pins received in said sockets whereby the ends of the sections will be held in register. In thus forming the plate in sections, the plate sections may be assembled around the axle 12 without removing the wheel therefrom. Formed on the inner end face of the plate are concentric spacing ribs 19 normally seating against the bottom wall of the recess 13 for spacing the inner end face of the plate away from said bottom wall and formed through these ribs at spaced points thereabout are grooves 20, each of the grooves of one rib being preferably arranged opposite a groove of the other rib. Thus, a fluid may be introduced into the recess behind the hub plate when the fluid will flow through the grooves 20 to be equally distributed around the inner end of the plate. Formed on the inner end of the plate is a stud 21 which engages in a socket 22 in the bottom wall of the recess 13 for locking the plate against rotation within the recess.

From the foregoing it will be understood that initially the plate 18 will close the inner end of the vent opening 17 and that when the screw 15 is adjusted the fluid within the recess in the hub in which the plate is housed will be compressed thus forcing the plate in an outward direction and into cushioned bearing engagement with the journal box. However, as previously explained, the plate after a long period of use would become worn to such a thinness that if it were further adjusted it would be liable to become displaced and upon the imposition of any sudden stress it would in all probability be crushed thus causing injury to the wheel hub, tearing away the wall of the journal box, and probably causing other damage. In other words, as such plates become worn they may be adjusted with safety until they are of a predetermined thinness after which time it is unsafe to further adjust the plates or to operate the locomotive. In order to overcome this difficulty the vent opening 17, heretofore described, is provided and it will be evident that after the plate has been worn down and adjusted to assume a predetermined position within the recess in the hub, any further adjustment of the screw 15 will serve merely to eject the fluid from the recess through the said vent opening thereby not only inhibiting further adjustment of the plate but also indicating to an observer that the limit of safe adjustment has been reached and that the plate requires renewal. However, should it be desired to remove the hub plate from the hub, it will simply be necessary to plug the vent opening, when the plunger may then be operated for completely expelling the hub plate from its socket. I accordingly provide an arrangement whereby, under normal circumstances, the hub plate may be readily adjusted inwardly without likelihood of displacing the plate from the hub while, when desired, this result may be readily accomplished. Further, as will be appreciated, the invention may be incorporated into the wheel hubs of substantially any standard type of locomotive, as now in common use.

Having thus described the invention, what is claimed as new is:

1. In a device of the class described, a hub having a recess, a hub plate seated in said recess, means operable to compress a fluid within the recess behind the said plate whereby to outwardly adjust the said plate, and vent means for relieving the pressure when the plate has been adjusted outwardly a predetermined distance.

2. In a device of the class described, a hub having a recess, a hub plate seated in said recess, and means operable to compress a fluid within the recess behind the said plate whereby to outwardly adjust the said plate, the hub being provided with a vent opening communicating with the recess between the inner and the outer ends thereof.

In testimony whereof I affix my signature.

FLOYD D. LAMBERT. [L. S.]